United States Patent
Balaraman

(10) Patent No.: US 11,741,646 B2
(45) Date of Patent: Aug. 29, 2023

(54) INTERACTIVE 3-D HEATMAP GENERATION OF WI-FI WAVE PATTERNS IN VIRTUAL ENVIRONMENTS FOR REAL-TIME OPTIMIZATION OF ACCESS POINT COVERAGE IN PHYSICAL ENVIRONMENTS

(71) Applicant: Fortinet, Inc., Sunnyvale, CA (US)

(72) Inventor: Sridhar Balaraman, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 101 days.

(21) Appl. No.: 17/218,735

(22) Filed: Mar. 31, 2021

(65) Prior Publication Data

US 2022/0319073 A1  Oct. 6, 2022

(51) Int. Cl.
*G06T 11/20* (2006.01)
*G06T 11/00* (2006.01)
*H04W 16/20* (2009.01)

(52) U.S. Cl.
CPC .......... *G06T 11/206* (2013.01); *G06T 11/001* (2013.01); *H04W 16/20* (2013.01)

(58) Field of Classification Search
None
See application file for complete search history.

(56) References Cited

U.S. PATENT DOCUMENTS 10,484,114 B1 * 11/2019 Nijim ...................... H04L 41/12
2015/0264519 A1 * 9/2015 Mirzaei .................. H04W 4/02
455/457

OTHER PUBLICATIONS

Koutitas G, Kumar Siddaraju V, Metsis V. In situ wireless channel visualization using augmented reality and ray tracing. Sensors. Jan. 27, 2020;20(3):690 (Year: 2020).*
Sanchez-Hidalgo MA, Cano MD. A survey on visual data representation for smart grids control and monitoring. Sustainable Energy, Grids and Networks. Dec. 1, 2018;16:351-69 (Year: 2018).*
Acrylic, "Heat Maps Acrylic WiFi, User Manual", Mar. 10, 2016, https://www.acrylicwifi.com/wp-content/uploads/2016/05/Manual-Acrylic-WiFi-Heatmaps-v3-English.pdf (Year: 2016).*
Bellekens B, Penne R, Weyn M. Realistic indoor radio propagation for sub-GHz communication. Sensors. Jun. 1, 2018;18(6):1788 (Year: 2018).*

* cited by examiner

*Primary Examiner* — Sarah Le
(74) *Attorney, Agent, or Firm* — Law Office Of Dorian Cartwright; Dorian Cartwright

(57) ABSTRACT

A wave generation module can illustrate an aggregate wave pattern in a virtual environment representative of a physical environment in 3-D. The aggregate wave pattern takes into account an effect of the composition characteristics of the structural walls and fixtures on the wave generating characteristics for the of access points.

20 Claims, 5 Drawing Sheets

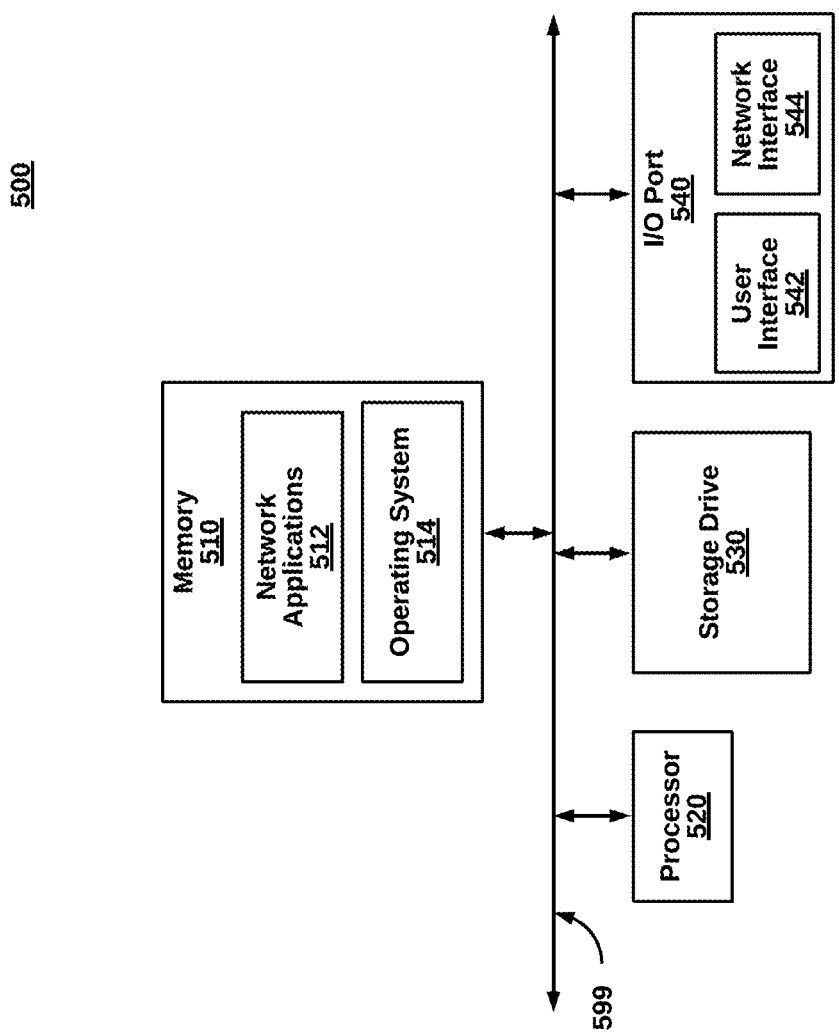

INTERACTIVE 3-D HEATMAP GENERATION OF WI-FI WAVE PATTERNS IN VIRTUAL ENVIRONMENTS FOR REAL-TIME OPTIMIZATION OF ACCESS POINT COVERAGE IN PHYSICAL ENVIRONMENTS

FIELD OF THE INVENTION

The invention relates generally to computer networking, and more specifically, to generating 3-D (3-dimensional) heatmaps of access point wave patterns in a virtual environment for optimizing coverage of access points in a physical environment.

BACKGROUND

In a Wi-Fi environment, access points provide RF (radio frequency) signals that provide coverage to areas that allow wireless devices to connect with a backbone network for access to the Internet or an enterprise network, for example. Mobile devices move around the coverage area, such as when user walks around an office while using a smartphone over the Internet. RF coverage areas generally radiates in a circular pattern from the access point, with the RF signal being strongest near the center and gradually weakening as the radius from the center increases. Multiple access points with overlapping radial coverage can increase the overall Wi-Fi availability to users.

Problematically, coverage is attenuated by physical objects, such as structural walls of a building, and other objects, such as furniture. As a result, the coverage is not uniform and dead areas can cause data connections to be suddenly dropped or experience slow data speeds. These dead zones cannot be easily predicted as the reflection and refraction of signals is affected differently by different structures and objects. Furthermore, conventional 2-D (2-dimensional) heatmaps limit visualization of Wi-Fi coverage issues of signal propagation.

What is needed is a robust technique for generating a 3-D heat map of Wi-Fi wave patterns in a more immersive and interactive virtual environment for real-time optimization of access point coverage in a physical environment.

SUMMARY

To meet the above-described needs, methods, computer program products, and systems for generating an interactive 3-D heat map of Wi-Fi wave patterns in a virtual environment for optimizing access point coverage in a physical environment, the 3-D heatmapping device.

In one embodiment, a site mapping module can receive an upload of a site survey for rendering the physical environment in the virtual environment. The site survey comprises coordinates for a plurality of structural walls and fixtures and composition characteristics of each of the structural walls and fixtures. An access point placement module can receive coordinates for a plurality of access points corresponding to the physical environment for rendering in the virtual environment. The wave generating characteristics are obtained for each of the plurality of access points based on a model of each of the access points.

In another embodiment, a wave generation module can illustrate an aggregate wave pattern in the virtual environment taking into account an effect of the composition characteristics of the plurality structural walls and fixtures on the wave generating characteristics for the plurality of access points.

Advantageously, network performance is improved along with the performance of connected computers, with optimized access point layouts.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 5 is a block diagram illustrating an example computing device, according to one embodiment.

DETAILED DESCRIPTION

Methods, computer program products, and systems for generating a 3-D heat map of Wi-Fi wave patterns in a virtual environment for optimizing access point coverage in a physical environment, the 3-D heatmapping device.

Figure 1:
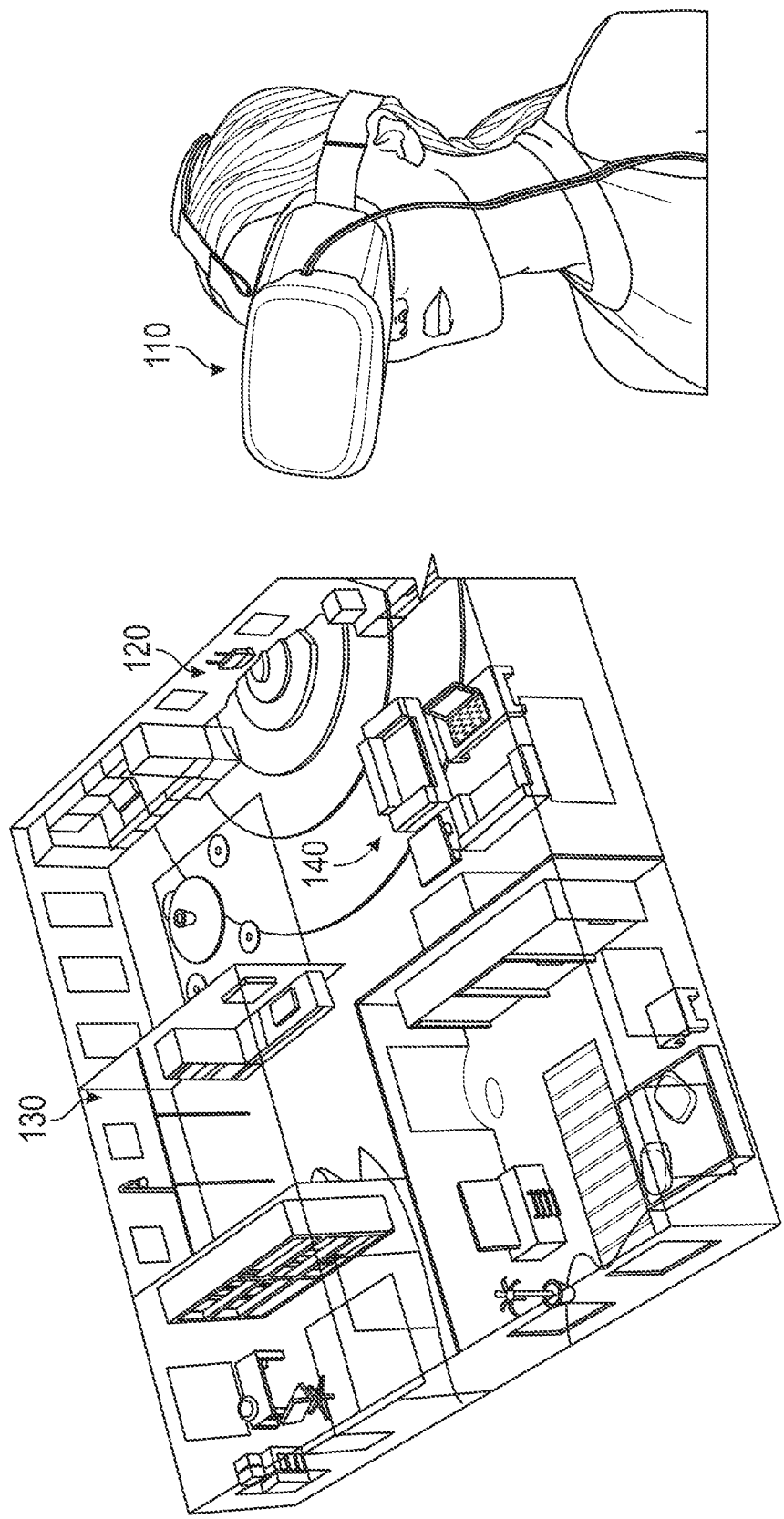
FIG. 1 is a high-level block diagram illustrating a system for generating of Wi-Fi wave patterns in a virtual environment for optimizing access point coverage in a physical environment, according to one embodiment.
Figure 2:
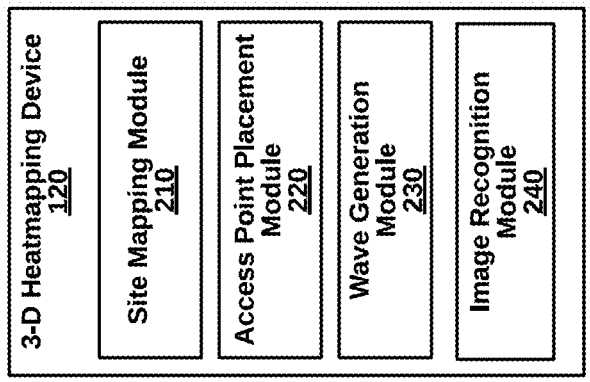
FIG. 2 is a more detailed block diagram illustrating an example 3-D heatmapping device of the system of FIG. 1, according to one embodiment.

Systems for 3-D Wi-Fi Wave Pattern Heatmaps (FIGS. 1-2)

FIG. 1 is a high-level block diagram illustrating a system 100 for generating of Wi-Fi wave patterns in a virtual environment for optimizing access point coverage in a physical environment, according to one embodiment. The system 100 includes a 3-D heatmapping device 110, an access point 120, a structure 130 and an object 140.

Many other embodiments of the system 100 besides the present use case are possible. For example, the system 100 can optionally include remote online servers with databases of structures and objects, and maps. Other embodiments can include a GPS system or other location system to locate the 3-D heatmapping device 110 in real-time relative to a virtual environment. Moreover, a more robust application can run on a PC with a keyboard and mouse, or on a tablet computer, and exchange information with the 3-D heatmapping device 110. Components can be implemented in hardware, software or a combination of both, one example of which is shown in FIG. 5.

The 3-D heatmapping device 110 generates 3-D heatmaps of access point wave patterns using augmented reality or virtual reality. In on embodiment, a user wears goggles with a display inside for complete immersion into Wi-Fi signal analysis. In another embodiment, a user points a smartphone or computer tablet with a camera towards the physical environment. The wave signals can be from a single access point, or can be an aggregated signal showing the combined coverage of several access points. The wave signals take into account characteristics of the access points and characteristics of the structure (e.g., wall 130) and objects (e.g., chair 140) on the site. For example, a concrete wall will have different signal refraction and reflection characteristics from a wood or sheetrock wall, a wooden or ceramic floor or a glass window. The orientation of a vertical wall versus a floor or ceiling can also affect signals.

For augmented reality, animated wave signals can overlay an actual physical environment as the user looks in different direction and orientations, based on placement of access points. More generally, augmented reality refers to an interactive experience of a real-world environment where objects that reside in the real world are enhanced by computer-generated perceptual information. In this case, wave signals update as the user moves around the site. Moveable objects, such as a bookcase or door can be adjusted to see the effect in real-time. Computer vision (e.g., Google Lens) can recognize structural parts of the physical environment automatically, ask the user for confirmation. Objects can also be recognized by comparison to known objects, such as chairs, doors, and light fixtures. Outdoor objects can include trees and garages. Specific access points can be recognized by shape, QR scan code, or other technique, to identify a vendor and model number.

For virtual reality, the user need not be located in the actual physical environment, as the entire site is virtually represented and gives the illusion of actually being there. Compared to augmented reality, provides a complete immersion experience that shuts out the real-world. A real-world site may can be uploaded with coordinates and spans of structure walls for substantially complete rendering in the virtual environment. Objects can be selected from a user interface and placed in the virtual environment or uploaded with the site map.

To give feedback of signal quality, the signal can be color coded to green for strong strength signals, yellow for medium strength signals and red for weak strength signal. Also, numerical values or some other visual indicator is possible. In one case, RSSI measurements are taken from the 3-D heatmapping device 110 for actual signal strength. A virtual access point that is not actually physically present can be added to the virtual environment in real-time, thereby causing an aggregated wave signal to update and show how coverage strength would potentially change by adding a new access point to the existing access point.

The access point 120 includes an antenna to transmit RF signals for communication to wireless stations within range. Wave generation is specific to a type of access point. It is therefore relevant to know the specific access point to determine the signal strength from vendor information. The access point 120 can also be set to different modes and protocols that change wave patterns. Several access points can work in coordination to provide combined coverage for mobile stations. In some points the signal will overlapping, giving a choice for stations. For ease, the strongest signal can be represented in the wave signal, but in some implementations, both wave signals are represented.

FIG. 2 is a more detailed block diagram illustrating Wi-Fi controller 110 of the system 100, according to an embodiment. The 3-D heatmapping device includes a site mapping module 210, an access point placement module 220, a wave generation module 230 and, optionally, an image recognition module 240. The components can be implemented in hardware, software, or a combination of both.

The site mapping module 210 can receive an upload of a site survey, or can receive camera input, for rendering the physical environment in the virtual environment. The site survey comprises coordinates for a plurality of structural walls and fixtures and composition characteristics of each of the structural walls and fixtures. The site survey can be a single office or include neighboring offices for which coverage is not required, and adjoining floor levels upstairs and downstairs. The site survey can also extend outdoors or be completely representative of outdoor coverage. The coordinates can be input to an interface from a GPS device, a survey, architectural plans, or a software room layout tool, manual measurements of length, width and height, for example. Alternatively, the interface can allow users to build a site layout from a toolset in WYSIWIG (what you see is what you get) application on the 3-D heatmap device, or a PC application.

The access point placement module 220 can receive coordinates for a plurality of access points corresponding to the physical environment for rendering in the virtual environment, or an interface can provide a toolset for user placement. The wave generating characteristics are obtained for each of the plurality of access points based on a vendor and model of each of the access points. One implementation of the access point placement module 220 suggests placement or new access points (e.g., specific access point model) and movement of existing access points in order to improve coverage. Other suggestions can include channel selection and device and antenna orientation. A final access point layout can be output in a snapshot, CSV file or other format.

The wave generation module 230 can illustrate an aggregate wave pattern in the virtual environment taking into account an effect of the composition characteristics (e.g., refraction and reflection) of the plurality structural walls and fixtures on the wave generating characteristics (e.g., signal strength and antenna) for the plurality of access points. One embodiment animates the wave patterns. For multiple access points, a single aggregate wave pattern can be displayed, or each wave pattern can be distinguished by color or pattern. Furthermore, some embodiments distinguish cooperating access points under a common Wi-Fi controller from foreign access points from neighboring systems (e.g., to show interference from a next-door office).

The image recognition module 240 is an optional feature for automatically identifying structures and objects. Input from a camera can be compared against known objects and identified based on a probability analysis. Confirmation can be requested from a user in some cases. An access point can be recognized on a first level, and a specific vendor and model can be recognized on a second level.

Figure 3:
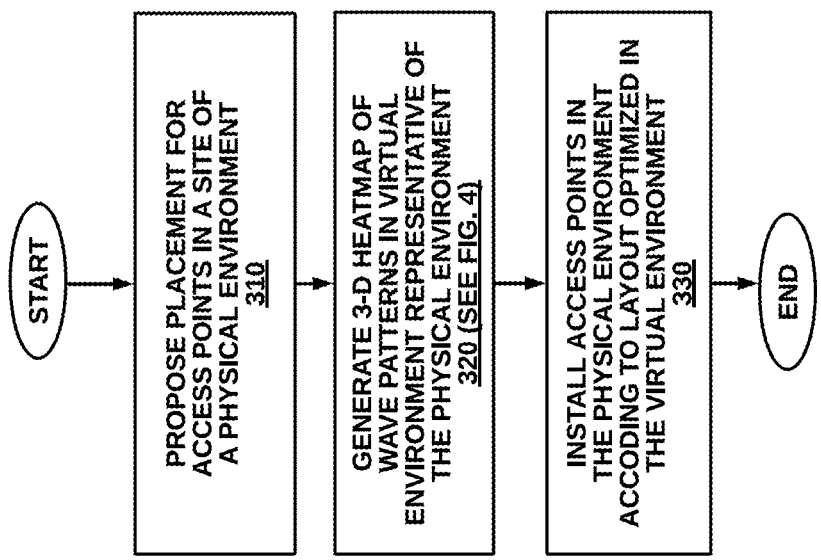
FIG. 3 is a high-level flow chart illustrating a method for laying out access points with augmented reality or virtual reality for optimal coverage, according to one embodiment.
Figure 4:
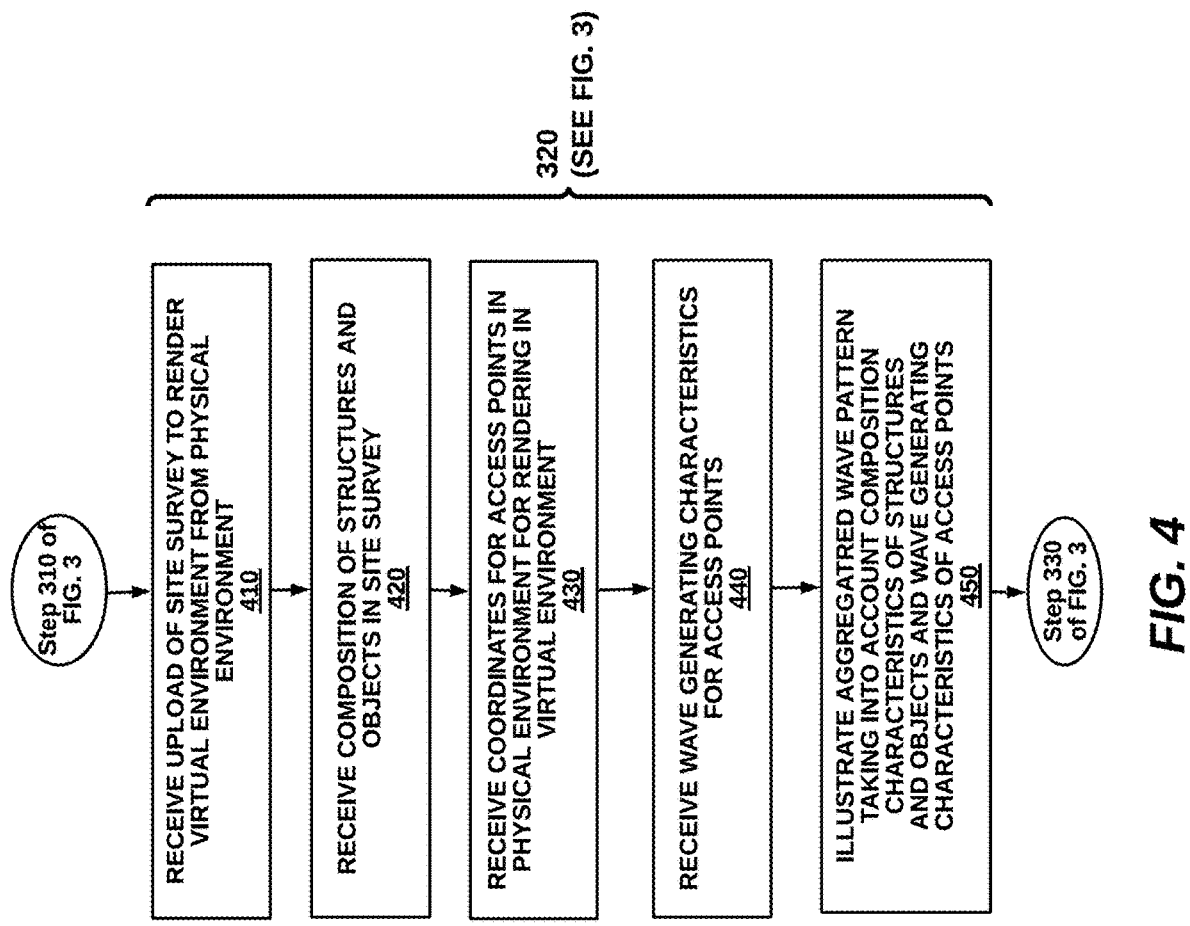
FIG. 4 is a more detailed flow chart illustrating a step of generating of Wi-Fi wave patterns in a virtual environment for optimizing access point coverage in a physical environment of the method of FIG. 4, according to an embodiment.

Methods for Wi-Fi Connectivity Management (FIGS. 3-4)

FIG. 3 is a high-level flow diagram illustrating a method 300 for laying out access points with augmented reality or virtual reality to optimize Wi-Fi coverage for wireless devices, according to one embodiment. The method 300 can be implemented by, for example, the 3-D heatmapping device 110 of FIG. 1, or other augmented reality or virtual reality devices. The steps of the method can be performed as shown or in different orders, with additional steps included, over various embodiments.

At step 310, a set of access points is proposed for placement in a site of a physical environment. At step 320, a 3-D heatmap of wave patterns is generated in a virtual environment representative of the physical environment, as further detailed below with respect to FIG. 5. At step 330, the access points are installed in a physical environment according to a layout optimized in the virtual environment.

At step 410, an upload of a site survey is received for rendering the physical environment in the virtual environment.

At step 420, composition characteristics of each of the structural walls and fixtures are received. These can be uploaded by a user or automatically retrieved. In an embodiment, wood floors are indicated, and in another embodiment, a reflection and/or refraction coefficient is indicated for floors.

At step 430, coordinates are received for one or more of access points corresponding to the physical environment for rendering in the virtual environment.

At step 440, wave generating characteristics are received for each of the plurality of access points based on a model of each of the access points.

At step 450, an aggregate wave pattern is illustrated in the virtual environment taking into account an effect of the composition characteristics of the plurality structural walls and fixtures on the wave generating characteristics for the plurality of access points.

Generic Wi-Fi Connectivity Computing Device (FIG. 5)

FIG. 5 is a block diagram illustrating an exemplary computing device 500 for use in the system 100 of FIG. 1, according to one embodiment. The computing device 3-D 500 is an exemplary device that is implementable for each of the components of the system 100, such as the Wi-Fi controller 110, the access points 120A-C and the station 130. Additionally, the computing device 5 is merely an example implementation itself, since the system 100 can also be fully or partially implemented with laptop computers, tablet computers, smart phones, Internet appliances, and the like.

The computing device 5, of the present embodiment, includes a memory 510, a processor 520, a hard drive 530, and an I/O port 3-D 540. Each of the components is coupled for electronic communication via a bus 599. Communication can be digital and/or analog and use any suitable protocol.

The memory 510 further comprises network applications 512 and an operating system 514. The network applications 520 can include the modules of network applications. Other network applications can include 512 a web browser, a mobile application, an application that uses networking, a remote application executing locally, a network protocol application, a network management application, a network routing application, or the like.

The operating system 514 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 6 or Windows 10), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 520 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the hard drive 530.

The storage device 530 can be any non-volatile type of storage such as a magnetic disc, EEPROM, Flash, or the like. The storage device 530 stores code and data for applications.

The I/O port 540 further comprises a user interface 542 and a network interface 544. The user interface 542 can output to a display device and receive input from, for example, a keyboard. The network interface 544 connects to a medium such as Ethernet or Wi-Fi for data input and output. In one embodiment, the network interface 544 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.ac and 802.11ax, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A three-dimensional (3-D) heatmapping device for generating a 3-D heat map of Wi-Fi wave patterns in a virtual environment for optimizing access point coverage in a physical environment, the 3-D heatmapping device comprising:
   a processor;
   a network interface, communicatively coupled to the processor and to the data communication network; and a memory device, communicatively coupled to the processor and to the network interface, the memory device storing code that when executed by the processor, comprises:
  a site mapping module to receive an upload of a site survey for rendering the physical environment in the virtual environment, wherein the site survey comprises coordinates for a plurality of structural walls and fixtures and composition characteristics of each of the structural walls and fixtures;
  an access point placement module to receive coordinates for a plurality of access points corresponding to the physical environment for rendering in the virtual environment, and to receive wave generating characteristics for each of the plurality of access points based on a model of each of the access points; and
  a wave generation module to illustrate an aggregate wave pattern in the virtual environment taking into account an effect of the composition characteristics of the plurality structural walls and fixtures on the wave generating characteristics for the plurality of access points.

2. The 3-D heatmapping device of claim 1, wherein the virtual environment comprises a virtual reality environment.

3. The 3-D heatmapping device of claim 1, wherein the virtual environment comprises an augmented reality environment.

4. The 3-D heatmapping device of claim 1, wherein the site mapping module recognizes at least one of the plurality of structural walls and fixtures with computer vision, and automatically retrieves at least one of the composition characteristics.

5. The 3-D heatmapping device of claim 1, wherein the access point placement module recognizes at least one of the plurality of access points with computer vision, and automatically retrieves at least one of the wave generating characteristics.

6. The 3-D heatmapping device of claim 1, wherein the wave generation module illustrates an animated aggregate wave pattern.

7. The 3-D heatmapping device of claim 1, wherein the wave generation module illustrates the aggregated wave pattern with color codes including green for a strong signal strength, yellow for a medium signal strength, and red for a weak signal strength.

8. The 3-D heatmapping device of claim 1, further comprising a head support attached to a wearable display to enable a user to wear the 3-D heatmapping device.

9. The 3-D heatmapping device of claim 1, wherein the access point placement module outputs the coordinates of the plurality of access points.

10. The 3-D heatmapping device of claim 1, wherein the plurality of access points of the virtual environment corresponds to actual access points within the physical environment of the site survey.

11. The 3-D heatmapping device of claim 1, wherein the plurality of access points of the virtual environment corresponds to virtual access points simulating placement within the physical environment of the site survey.

12. The 3-D heatmapping device of claim 1, wherein the plurality of access points of the virtual environment corresponds to a combination of actual access points and virtual access points within the physical environment of the site survey.

13. The 3-D heatmapping device of claim 1, wherein the wave generation module in generating the aggregate wave pattern accounts for refraction and reflection of RF waves with respect to the wave generating characteristics affected by the composition characteristics.

14. The 3-D heatmapping device of claim 1, wherein the access point placement module suggests a new location for at least one of the plurality of access points.

15. The 3-D heatmapping device of claim 1, wherein the wave generation module updates the aggregate wave pattern responsive to a new location for at least one of the plurality of access points.

16. The 3-D heatmapping device of claim 1, wherein the wave generation module updates the aggregate wave pattern responsive to an update to the site map.

17. The 3-D heatmapping device of claim 1, wherein the wave generation module generates the aggregate wave pattern based on a current location and orientation of the 3-D heatmapping device.

18. The 3-D heatmapping device of claim 1, wherein the site survey comprises outdoor areas in the physical environment.

19. A computer-implemented method in a three-dimensional (3-D) heatmapping device for generating a 3-D heat map of Wi-Fi wave patterns in a virtual environment for optimizing access point coverage in a physical environment, the method comprising:
  receiving an upload of a site survey for rendering the physical environment in the virtual environment, wherein the site survey comprises coordinates for a plurality of structural walls and fixtures and composition characteristics of each of the structural walls and fixtures;
  receiving coordinates for a plurality of access points corresponding to the physical environment for rendering in the virtual environment
  receiving wave generating characteristics for each of the plurality of access points based on a model of each of the access points; and
  illustrating an aggregate wave pattern in the virtual environment taking into account an effect of the composition characteristics of the plurality structural walls and fixtures on the wave generating characteristics for the plurality of access points.

20. A non-transitory computer-readable media storing source code, in a three-dimensional (3-D) heatmapping device, when the source code is executed by a processor, the 3-D heatmapping device performs a method for generating a 3-D heatmap Wi-Fi wave patterns in a virtual environment for optimizing access point coverage in a physical environment, the method comprising:
  receiving an upload of a site survey for rendering the physical environment in the virtual environment, wherein the site survey comprises coordinates for a plurality of structural walls and fixtures and composition characteristics of each of the structural walls and fixtures;
  receiving coordinates for a plurality of access points corresponding to the physical environment for rendering in the virtual environment
  receiving wave generating characteristics for each of the plurality of access points based on a model of each of the access points; and
  illustrating an aggregate wave pattern in the virtual environment taking into account an effect of the composition characteristics of the plurality structural walls and fixtures on the wave generating characteristics for the plurality of access points.

* * * * *